United States Patent Office 3,567,664
Patented Mar. 2, 1971

3,567,664
POLYURETHANE FOAMS STABILIZED AGAINST SCORCH WITH A MIXTURE OF BUTYLATED HYDROXY TOLUENE AND p,p'-DIOCTYL DIPHENYL AMINE
Robert C. Haring, Woodbridge, Conn., assignor to Olin Corporation
No Drawing. Continuation-in-part of application Ser. No. 540,806, Apr. 7, 1966. This application Oct. 15, 1968, Ser. No. 767,808
Int. Cl. C08g 22/46, 22/00
U.S. Cl. 260—2.5                12 Claims

ABSTRACT OF THE DISCLOSURE

Polyurethane foams are stabilized against scorching when a mixture of 2,6-ditertiary-butyl-4-methyl phenol and a p,p'-dialkyl diphenyl amine containing between about 3 and about 18 carbon atoms in the alkyl, is present in a foam forming reaction mixture of an organic diisocyanate, the reaction product of a 1,2-oxide and an aliphatic polyhydric alcohol contains between 2 and 6 hydroxyl groups and 2 and 8 carbon atoms per molecule, a reaction catalyst and a foaming agent. The proportion of the amine in the stabilizing mixture is between about 15 and 90 percent by weight.

---

This application is a continuation-in-part of co-pending application Ser. No. 540,806, filed Apr. 7, 1966, by Robert C. Haring, now abandoned.

This invention relates to a process for stabilizing polyether polyols and for stabilizing polyurethane foams and to the stabilized compositions produced thereby.

Polyether polyols are used extensively as a major reactant in the preparation of polyurethane foams. Under certain conditions these polyether polyols are subject to oxidation which causes discoloring as well as diminishing of the reactivity. In addition, one of the problems encountered in the preparation of polyurethane foams is that the foam becomes scorched under certain reaction conditions, which severely degrades the physical properties of the foams, even when prepared from polyether polyols which are free from any significant oxidative degradation. Furthermore, some polyurethane foams become discolored or scorched in a few hours when stored, especially when polyurethane foam slabs are stored in relatively high stacks. Storage of polyurethane foam slabs in this manner inhibits heat transfer from the interior of the foam, particular from those slabs in the center of the stack, and as a result, the high concentration of heat frequently causes discoloration and scorching.

It is an object of this invention to provide a novel stabilizing system for inhibiting polyether polyols against oxidation.

Another object of this invention is to provide polyether polyols stabilized against oxidative degradation.

Still another object of the invention is to provide polyurethane foam stabilized against scorching.

A further object of the invention is to provide a novel stabilizer system to inhibit scorching of polyurethane foams.

These and other objects of the invention will be apparent from the following detailed description thereof.

It has now been discovered that the foregoing objects are accomplished when a stabilizing proportion of a mixture of 2,6-di-tertiary-butyl-4-methyl phenol and a dialkyl diphenyl amine is admixed with a polyether polyol to inhibit oxidation thereof, and when the stabilized mixture is employed in the preparation of polyurethane foams from a polyether polyol, an organic polyisocyanate, a foaming agent and a reaction catalyst.

In preparing the stabilizer system of this invention, the 2,6-ditertiary-butyl-4-methyl phenol, which is referred to hereinafter as "butylated hydroxy toluene," is admixed with a suitable p,p'-dialkyl diphenyl amine. The alkyl moiety of the substituted amine contains between about 3 and about 18 and preferably between about 6 and about 10 carbon atoms. Typical examples of suitable p,p'-dialkyl diphenyl amines are as follows:

(1) p,p'-dipropyl diphenyl amine
(2) p,p'-diamyl diphenyl amine
(3) p,p'-dihexyl diphenyl amine
(4) p,p'-dioctyl diphenyl amine
(5) p,p'-didodecyl diphenyl amine
(6) p,p'-ditetradecyl diphenyl amine
(7) p,p'-dioctodecyl diphenyl amine It will be recognized by those skilled in the art that the alkyl substituents may not be the same on each phenyl group and that mixtures of alkyl substituents may be employed. For example, suitable compounds include p-octyl-p'-dodecyl diphenyl amine and similar amines having different alkyl substituents on the phenyl groups.

The stabilizer mixture is usually comprised of between about 15 and about 90 percent and preferably between about 25 and about 85 percent by weight of the dialkyl diphenyl amine. There appears to be a synergistic effect when the butylated hydroxy toluene is admixed with the amine in these proportions since these mixtures are more effective than when the same amount of butylated hydroxy toluene or the amine is used separately.

The proportion of the stabilizer mixture employed is usually between about 10 and about 50,000 and preferably between about 500 and about 5,000 parts per million of the polyether polyol. More preferably, the proportion of stabilizer mixture employed is in the range between about 2,000 and about 4,000 parts per million of polyether polyol. In order to obtain the maximum benefit of the stabilizer mixture, it is preferably admixed with the polyether polyol prior to employing the polyol in the preparation of urethane foams. However, when degradation of the polyether polyol is not a problem, the stabilizer mixture can be added with the other reactants when preparing the polyurethane foam. The proportion of the stabilizer mixture, when employing the latter technique, is still based upon the proportion of polyether polyol as described above.

Polyether polyols which are stabilized in accordance with the process of this invention include the reaction product of a 1,2-oxide with an aliphatic polyhydric alcohol containing between about 2 and about 6 hydroxyl groups, and between about 2 and about 8 carbon atoms per molecule. Suitable compounds useful in preparing these polyether polyols include lower alkylene oxides containing between about 2 and about 8 carbon atoms, such as ethylene oxide, propylene oxide, butylene oxide, cyclohexene oxide, and glycidol. Mixtures of these 1,2-oxides are also useful in preparing polyether polyols which can be stabilized by the technique of this invention. The polyether polyol may be formed by known techniques in which an aliphatic polyhydric alcohol or compound is reacted with a single 1,2-oxide or a mixture of two or more of the 1,2-oxides. If desired, the alcohol may be first oxyalkylated with one 1,2-oxide, followed by oxyalkylation with a different 1,2-oxide or a mixture of 1,2-oxides. If desired, the resulting oxyalkylated alcohol then can be further oxyalkylated with a still different 1,2-oxide.

For convenience, the term "mixture," when applied to a polyether polyol containing a mixture of 1,2-oxides, is intended to include both random and/or block polyethers such as (1) random addition obtained by simultaneously reacting two or more 1,2-oxides with the polyhydric compound,
(2) block addition in which the polyhydric compound is first reacted with one 1,2-oxide and then reacted with a second 1,2-oxide.
(3) block addition (2) followed by random addition (1) or an additional block of 1,2-oxide.

Any suitable ratio of different 1,2-oxides may be employed. When a mixture of ethylene oxide and propylene oxide are utilized to form polyethers by random and/or block addition, the proportion of ethylene oxide is generally between about 3 and about 60, and preferably between about 5 and about 50 weight percent of the mixture.

Aliphatic polyhydric alcohol reactants in the polyether polyol are those containing between 2 and about 6 hydroxyl groups and between 2 and about 8 carbon atoms per molecule, as illustrated by compounds such as the following: ethylene glycol, propylene glycol, 2,3-butylene glycol, 1,3-butylene glycol, 1,5-pentane diol, 1,6-hexene idol, glycerol, trimethylolpropane, sorbitol, pentaerythritol, mixtures thereof and the like. In addition, cyclic aliphatic polyhydric compounds such as starch, glucose, sucrose, methyl glucoside and the like may also be employed in the preparation of the polyether polyol. Each of the aforesaid polyhydric compounds and alcohols can be oxyalkylated with ethylene oxide, propylene oxide, butylene oxide, cyclohexene oxide, glycidol, or mixtures thereof. For example glycerol is first oxyalkylated with propylene oxide and the resulting polyether polyol is then oxyalkylated with ethylene oxide. Alternatively, glycerol is reacted with ethylene oxide and the resulting polyether polyol is reacted with propylene oxide. If desired, each of the resulting polyethers can be further reacted with an mixture of propylene oxide and ethylene oxide. Each of the above-mentioned polyhydric compounds can be reacted with mixtures of ethylene oxide and propylene oxide or any two or more of any of the aforesaid 1,2-oxides, in the same manner. Techniques for preparing suitable polyethers from mixed 1,2-oxides are shown in U.S. Pat. No. 2,674,619 issued to Lunsted on Apr. 6, 1954; U.S. Pat. No. 2,733,272, issued to Horsley et al., on Jan. 31, 1956; U.S. Pat. No. 2,831,034, issued to Pruitt et al. on Apr. 15, 1958; U.S. Pat. No. 3,036,118, issued to Jackson et al. on May 22, 1962; U.S. Pat. No. 2,948,757, issued to Pruitt et. al. on Aug. 9, 1960. All of these polyether polyols can be stabilized in accordance with the process of the invention.

Sufficient alkylene oxide is added to the polyhydric alcohol to provide a molecular weight in the range of between about 200 and about 10,000, and preferably between about 250 and about 8000.

Polyether polyols containing the above-mentioned stabilizer mixture in the above-mentioned proportions may be used as lubricants, heat transfer fluids, hydraulic fluids, surface active agents, and the like but are preferably employed as a reactant in the prepartion of polyurethane foams.

An organic polyisocyanate may be employed in the preparation of the polyurethane foams. This includes diisocyanates, triisocyanates, and polyisocyanates. Naturally the organic diisocyanates are preferred due to commercial availability, especially mixtures of isomers of tolylene diisocyanate which are readily available commercially. The most common isocyanate available is tolylene diisocyanate, which is a mixture of about 80 percent by weight of 2,4-tolylene diisocyanate and about 20 percent of the 2,6-isomer. Other typical isocyanates include, but are not limited to, the following: 4,4'-methylene-bis-(phenylisocyanate), 3,3' - bitolylene - 4,4'-diisocyanate, 3,3'-dimethoxy-biphenylene - 4,4' - diisocyanate, naphthalene - 1,5 - diisocyanate, hexamethylene diisocyanate, 1,4-phenylene diicosyanate, polyphenylene polymethylene isocyanate, etc. The amount of isocyanate employed in the preparation of the polyurethane foams should be sufficient to provide at least about 0.7 NCO groups per hydroxyl group present in the reaction system. This includes the number of hydroxyl groups present in the polyether polyol, the number of hydroxyl groups in any additive employed, and the number of hydroxyl groups employed in the foaming agent. An excess of isocyanate compound may be conveniently employed; however, this is generally undesirable due to the high cost of the isocyanate compounds. It is preferable, therefore, to employ no greater than about 1.5 NCO groups per hydroxyl group, and preferably between about 0.9 and 1.3 NCO groups per hydroxyl group.

The polyurethane foams are prepared in the presence of a foaming agent, reaction catalyst, and preferably a small proportion of a surfactant. The foaming agent employed may be any of those known to be useful for this purpose, such as water, which is preferred, the halogenated hydrocarbons, and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the polyether polyol, and generally water is employed in an amount of from 0.1 to 10 parts by weight per 100 parts by weight of the polyether polyol.

The polyurethane foams are prepared in the presence of a catalytic amount of a reaction catalyst. The catalyst employed may be any of the catalysts known to be useful for this purpose, or mixture thereof, including tertiary amines and metallic salts. Typical teritary amines include, but are not limited to, the following: N-methyl morpholine, N-hydroxyethyl morpholine, tri ethylene diamine, dimethyl ethanol amine, tetramethylbutane diamine, triethylamine and trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight of the polyether polyol.

Various additives may be employed in the preparation of polyurethane foams in order to achieve particular properties. Typical additives include, but are not limited to, the following: monocarborylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foams. Typical of such surfactants are the silicone oils of the type disclosed in U.S. Patent No. 2,834,748 issued May 13, 1958, to Donald L. Bailey et al. and in a book Rigid Plastics Foams by T. H. Ferrigno (1963), Reinhold Publishing Company, especially pages 40–42. Other suitable compounds useful as surfactants include synthetic detergents such as oxyethylated nonyl phenol and other ethylene oxide and glycidol-based surfactants. Generally up to 2 parts by weight of the surfactant is employed per 100 parts of polyether polyol.

Various additives can be employed which serve to provide different properties, e.g., fillers, such as clay, calcium sulfate, barium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and other anti-oxidants may be added.

Either the "one-shot" technique, the "prepolymer" technique or the "quasi-prepolymer" technique may be employed to prepare the polyurethane foams of this invention.

The proportion of stabilizer mixture necessary to stabilize the polyether polyol (10 to 50,000 parts per million of polyether polyol) is generally sufficient to stabilize the resuting foam against scorch. Thus, if the stabilizer mixture is not present in the polyether polyol used in the foam preparation, it may be added in the above defined proportions during the foaming reaction in order to produce a foam inhibited against scorch. Addition of this stabilizer mixture may be made as a concentrated solution in a portion of the polyether polyol, or as a slurry or solution in one of the other suitable liquid streams, such as the silicone surfactant.

The following examples are presented to illustrate the invention more fully without any intentions of being limited thereby. All parts and percentages are by weight unless otherwise specified.

EXAMPLES 1–7

A sample of oxypropylated glycerol having a molecular weight of 3,000 was divided into 9 portions identified as Portions A–I. Portions A–G were each admixed with a mixture of butylated hydroxy toluene and p,p'-dioctyl diphenyl amine. The composition of the novel stabilizer mixture used to stabilize each portion is set forth below in Table I as Examples 1–7. Portions H and I were mixed with a commercial stabilizer containing butylated hydroxy toluene. These portions are identified as Comparative Tests C–1 and C–2 in Table I.

After admixing Portions A–G of the polyether polyol with the stabilizer mixture, and Portions H and I with the commercial stabilizer containing butylated hydroxy toluene, each portion was placed in a Perkin-Elmer differential scanning calorimiter, Model DSC–1, to determine the temperature of transition, $T_i$, (which is the temperature of the initiation of oxidative decomposition) of the resulting stabilized polyether polyol. In the operation of this apparatus the sample to be tested was placed in an aluminum cup and heated along with a reference cup at a programmed rate (approximately 20° C. per minute) and the power necessary to keep both the sample and the reference material at a programmed temperature was recorded on the Y axis of the time-base recorder. At a transition of the sample the power difference supplied to each sample due to absorption or emission of energy by the sample was noted by a deflection in the recorder. The transition temperature was usually determined by locating the point of interception of the base line and the slope of the deflection. The higher the transition temperature of the sample the more stable was the sample.

TABLE I

| Portion | Parts per million of butylated hydroxy toluene | Parts per million of p,p'-dioctyl diphenyl amine | Transition temperature, ° C. |
|---|---|---|---|
| Example: | | | |
| 1 ... A | 150 | 3,550 | 210 |
| 2 ... B | 400 | 3,300 | 215 |
| 3 ... C | 1,000 | 2,700 | 219 |
| 4 ... D | 1,400 | 2,300 | 218.5 |
| 5 ... E | 1,800 | 1,900 | 216 |
| 6 ... F | 2,500 | 1,200 | 212 |
| 7 ... G | 3,000 | 700 | 206 |
| C–1 ... H | 150 | 0 | 177 |
| C–2 ... I | 3,700 | 0 | 197 |

It can be seen from the table that portion H, which contained no stabilizer mixture of this invention degraded at a substantially lower temperature than the portions which were treated with the stabilizing proportions of the mixtures of this invention. The table also shows that the use of only butylated hydroxy toluene (portion I) in the same total quantity of stabilizers as portions A through G also resulted in degradation at a temperature below about 200° C.

EXAMPLES 8–14

The procedure of Examples 1–7 was repeated with the exception that different proportions and different ratios of the butylated hydroxy toluene and amine were employed to stabilize the oxypropylated glycerol of Examples 1–7. The transition temperature of these examples are presented in Table II below.

TEBLE II

| | Parts per million of butylated hydroxy toluene | Parts per million of p,p'-dioctyl diphenyl amine | Transition temperature, ° C. |
|---|---|---|---|
| Example: | | | |
| 8 | 3,700 | 1,200 | 217 |
| 9 | 5,000 | 1,200 | 219 |
| 10 | 2,500 | 600 | 209.5 |
| 11 | 2,500 | 400 | 206.5 |
| 12 | 1,500 | 1,200 | 214 |
| 13 | 1,500 | 600 | 204 |
| 14 | 1,500 | 400 | 201.3 |

EXAMPLES 15–22

Polyurethane foams were prepared from the oxypropylated glycerol of Example 6 containing 3700 p.p.m. of a stabilizer mixture of butylated hydroxy toluene and p,p'-dioctyl diphenyl amine in a ratio of 2500 parts of butylated hydroxy toluene per 1200 parts of the amine. In preparing each foam 100 parts of the stabilized polyether polyol was placed in a container, followed by the addition of 2.0 parts of silicone surfactant, 0.4 part of triethylene diamine and 4 parts of water. This mixture was stirred at 5000 r.p.m. for 10–20 seconds and 0.2 part of stannous octoate catalyst was added with a syringe. After an additional 10–20 seconds, the stirrer speed was reduced to about 3500 r.p.m., and the tolylene diisocyanate was then added all at once from a container. In Examples 15–22, the quantity of tolylene diisocyanate was varied over an isocyanate index range from 90 to 130 (the isocyanate index being the percent of the stoichiometric quantity of NCO groups in the isocyanate required to react with all of the hydroxyl groups present in the mixture).

After seven seconds of reaction in the container, the contents were poured into a 12" x 12" cardboard box. After completion of the rise, the foams were post-cured at 100° C. for 10 minutes. Vertical blocks 1" thick x 6" x 6" were cut from near the center of each foam in each box, then wrapped in aluminum foil and placed in an oven at 375° F. for a period of 3 hours. In addition, samples of each of the foams were evaluated in the differential scanning calorimeter as described in Examples 1–7, and the transition temperature of the foam was determined. Presented below in Table III is the transition temperature for each of the foams prepared with various isocyanate indices.

TABLE III

| | Tolylene diisocyanate | | Transition temperature of foam, ° C. |
|---|---|---|---|
| | Parts | Index | |
| Example: | | | |
| 15 | 35 | 90 | 247.5 |
| 16 | 36.7 | 95 | 244.5 |
| 17 | 38.7 | 100 | 245.5 |
| 18 | 41.0 | 105 | 242.0 |
| 19 | 42.6 | 110 | 247.5 |
| 20 | 44.6 | 115 | 244.5 |
| 21 | 46.3 | 120 | 246.5 |
| 22 | 50.3 | 130 | 240.0 |

Each of the foams, after being removed from the 375° F. oven, was white, and no significant discoloring was observed.

For purposes of comparison a similar formulation was employed in making a flexible urethane foam except that only conventional stabilizer components were contained in the oxypropylated glycerol. Large buns having a height of about 30" each were stacked in groups of 9 buns. The temperature of the center bun reached as high as 300° F. and remained above about 250° F. for a period of about 16 hours. Buns stored in this manner, without employing a stabilizer system of this invention were scorched in the center and had a brown appearance.

For purposes of further comparison, similar polyurethane foam buns were made, utilizing the stabilizer mixture of Examples 15–22, and no scorch was observed when the buns were stored under these conditions.

EXAMPLES 23–29

The procedure of Example 1 was repeated with the exception that the oxypropylated glycerol was replaced with one of the following polyethers.

Examples:             Polyether polyol description
23 _____ Oxypropylated pentaerythritol having a molecular weight of approximately 4000.
24 _____ Oxypropylated propylene glycol having a molecular weight of approximately 2000.
25 _____ Glycerol initiator first reacted with propylene oxide to a hydroxyl number of 60.5, and then topped with 5 moles of ethylene oxide. The molecular weight of the polyether was approximately 3000.
26 _____ Glycerol initiator first reacted with propylene oxide to a molecular weight of 3730, and then topped with 5 moles of ethylene oxide. The molecular weight of the polyether was approximately 4000.
27 _____ Glycerol initiator is reacted with a mixture of ethylene oxide and propylene oxide in a ratio of approximately 18 percent ethylene oxide to 82 percent propylene oxide by weight to form a polyether having a molecular weight of approximately 4000.
28 _____ Pentaerythritol initiator reacted first with ethylene oxide and then topped with propylene oxide, the ethylene oxide representing 40 percent and the ethylene oxide representing 60 percent of the total alkylene oxide. The resulting polyether had a molecular weight of approximately 5340.
29 _____ Propylene glycol initiator reacted first with ethylene oxide and then topped with propylene oxide, the ethylene oxide being 40 percent and the propylene oxide being 60 percent of the total alkylene oxide. The molecular weight of the resulting polyether was approximately 2670.

Each of the above polyethers was divided into two portions, and each portion was admixed with either 3700 parts per million of butylated hydroxy toluene, or a mixture of 2500 parts of butylated hydroxy toluene and 1200 parts of p,p'-dioctyl diphenyl amine. Each portion was tested to determine the transition temperature in accordance with the procedure of Example 1.

Presented below in the table are the transition temperatures for each portion, and the delta $T_i$, the increase in the transition temperature resulting from the synergistic combination of butylated hydroxy toluene and p,p'-dioctyl diphenyl amine for polyethers stabilized in accordance with theabove procedure:

| | | Transition temperature, °C | |
|---|---|---|---|
| Polyol type | 3,700 p.p.m. BHT* | 2,500 p.p.m. BHT* plus 1,200 p.p.m. DDA** | $\Delta T_i$ |
| Example: | | | |
| 23___ Oxypropylated pentaerythritol_____ | 196.3 | 217.3 | 21.0 |
| 24___ Oxypropylated propylene glycol_____ | 190.3 | 216.3 | 25.7 |
| 25___ Oxypropylated glycerol topped with ethylene oxide (3,000 molecular weight). | 196.5 | 217.3 | 21.8 |
| 26___ Oxypropylated glycerol topped with ethylene oxide (4,000 molecular weight). | 196.1 | 216.3 | 20.2 |
| 27___ Random ethylene oxide and propylene oxide adduct of glycerol. | 196.0 | 219.0 | 23.0 |
| 28___ Oxyethylated pentaerythritol topped with propylene oxide. | 195.3 | 217.5 | 22.2 |
| 29___ Oxyethylated propylene glycol topped with ethylene oxide. | 190.0 | 215.3 | 25.3 |

*BHT=Butylated hydroxy toluene.
**DDA=p,p'-dioctyl diphenyl amine.

These data show that when 1200 parts of butylated hydroxy toluene were replaced with an equivalent weight of p,p'-dioctyl diphenyl amine to form a total stabilizer content of 3700 parts per million, the transition temperature was sharply increased for each of the polyols tested, thereby showing the stabilizing effect of this mixture.

EXAMPLES 30–36

Each of the polyethers of Examples 23–29 containing 2500 parts per million of butylated hydroxy toluene and 1200 parts of p,p'-dioctyl diphenyl amine, were used in the preparation of polyurethane foams by reacting each polyether with tolylene diisocyanate in the presence of basic catalyst, a surfactant and foaming agent. Each of the resulting foams was free from scorch when subjected to temperatures of between about 250 to 300° F. for a period of about 16 hours.

Various modifications of the invention, some of which have been referred to above, may be employed without departing from the spirit of the invention.

What is desired to be secured by Letters Patent is:

1. A polyurethane foam composition stabilized against scorch comprised of a polyurethane foam prepared by reacting (1) an organic polyisocyanate with
(2) a polyether polyol comprised of the reaction product of
 (a) a 1,2-oxide and
 (b) an aliphatic polyhydric alcohol containing between 2 and 6 hydroxyl groups and between 2 and 8 carbon atoms per molecule,
in the presence of
(A) a reaction catalyst,
(B) a foaming agent, and
(C) a scorch preventing proportion of a mixture of
(I) 2,6-ditertiary-butyl-4-methyl-phenol, and
(II) a p,p'-dialkyl diphenyl amine,
(i) wherein said alkyl contains between about 3 and about 18 carbon atoms, and
(ii) the proportion of said amine is between about 15 and about 90 percent by weight of said mixture.

2. The composition of claim 1 wherein the proportion of said amine is between about 25 and about 85 percent by weight of said mixture, and said alkyl contains between about 6 and about 10 carbon atoms.

3. The composition of claim 2 where the scorch preventing proportion is between about 10 and about 50,000 parts per million of said polyether polyol.

4. The composition of claim 2 wherein said amine is p,p'-dioctyl diphenyl amine.

5. The composition of claim 4 wherein the scorch preventing proportion is between about 500 and about 5000 parts per million of said polyether polyols.

6. The composition of claim 2 wherein said polyether polyol is the reaction product of a 1,2-oxide with an aliphatic polyhydric compound,
(1) said 1,2-oxide being selected from the group consisting of ethylene oxide, butylene oxide, propylene oxide, cyclohexene oxide, glycidol and mixtures thereof, and
(2) said polyhydric compound being selected from the group consisting of ethylene glycol, propylene glycol, 2,3-butylene glycol, 1,3-butylene glycol, 1,5-pentane diol, 1,6-hexene diol, glycerol, trimethylolpropane, sorbitol, pentaerythritol, starch, glucose, sucrose, methyl glucoside, and mixtures thereof.

7. The composition of claim 6 wherein said 1,2-oxide is propylene oxide.

8. The composition of claim 7 wherein said polyhydric compound is pentaerythritol.

9. The composition of claim 7 wherein said polyhydric compound is glycerol.

10. The composition of claim 7 wherein said polyhydric compound is propylene glycol.

11. The composition of claim 6 wherein said 1,2-oxide is a mixture of ethylene oxide and propylene oxide.

12. The composition of claim 11 wherein the proportion of ethylene oxide is in the range of between about 3 and about 60 percent by weight of said mixture.

References Cited
UNITED STATES PATENTS

| | | | |
|---|---|---|---|
| 2,687,377 | 8/1954 | Stewart et al. | 252—51.5 |
| 2,915,496 | 12/1959 | Swart et al. | 260—45.7 |
| 2,938,058 | 5/1960 | Tinsley et al. | 260—611.5 |
| 2,942,033 | 6/1960 | Leis et al. | 260—611.5 |
| 3,072,605 | 1/1963 | Rogers et al. | 260—45.95 |
| 3,194,773 | 7/1965 | Hostettler | 260—2.5 |
| 3,325,547 | 6/1967 | Cour et al. | 260—611.5 |
| 3,437,694 | 4/1969 | Austin | 260—611.5 |
| 3,452,056 | 6/1969 | Sundholm | 260—390 |

HOSEA E. TAYLOR, Primary Examiner

H. S. COCKERAM, Assistant Examiner

U.S. Cl. X.R.
260—77.5